(12) United States Patent
Zarif (10) Patent No.: US 6,691,428 B1
(45) Date of Patent: Feb. 17, 2004

(54) AIR DRYER

(75) Inventor: Mahmoud A. Zarif, Knoxville, TN (US)

(73) Assignee: Aircel Corporation, Alcoa, TN (US)

( * ) Notice: Subject to any disclaimer, the term of this patent is extended or adjusted under 35 U.S.C. 154(b) by 0 days.

(21) Appl. No.: 10/224,736

(22) Filed: Aug. 21, 2002

(51) Int. Cl.[7] ................................................ F26B 19/00
(52) U.S. Cl. ........................ 34/62; 34/76; 34/79; 34/86
(58) Field of Search ............................. 34/61, 62, 72, 34/73, 76, 79, 68, 69, 86

(56) References Cited

U.S. PATENT DOCUMENTS

| | | | | |
|---|---|---|---|---|
| 3,027,651 A | * | 4/1962 | Nerge ........................... | 34/402 |
| 4,155,726 A | * | 5/1979 | Steinmeyer ................... | 96/233 |
| 4,209,914 A | * | 7/1980 | Gustafsson ................... | 34/471 |
| 4,295,282 A | * | 10/1981 | Fox .............................. | 34/468 |
| 4,324,052 A | * | 4/1982 | Bosher ......................... | 34/471 |

OTHER PUBLICATIONS

Aircel Refrigerated Compressed Air Dryers, Leading the Industry in World–Class, Chlorine–Free Refrigerant Dryer Technology, Catalog, Aug. 2001.

Aircel Refrigerated Compressed Air Dryers, Leading the Industry in World–Class, Chlorine–Free, Refrigerant Dryer Technology, Catalog, Aug. 1994.

* cited by examiner

*Primary Examiner*—Ira S. Lazarus
*Assistant Examiner*—Kathryn S. O'Malley
(74) *Attorney, Agent, or Firm*—Luedeka, Neely & Graham PC (57) ABSTRACT

A separator for removing contaminants from compressed air, the separator including an elongate enclosure having an inlet end and an opposite outlet end, the inlet end of the separator being in flow communication with a source of compressed air, the separator defining a first air flow path between the inlet and outlet ends of the separator and a second air flow path between the outlet end of the separator and a wall member positioned adjacent outlet end of the separator for being contacted by air exiting the outlet end of the separator, wherein air traveling in the first flow path undergoes a volumetric expansion and substantial change of direction as it exits the separator and enters the second air flow path and further undergoes a change of direction as it impacts the wall member.

20 Claims, 13 Drawing Sheets

AIR DRYER

FIELD OF THE INVENTION

This invention relates generally to air dryers. More particularly, this invention relates to devices for removing moisture and contaminants from compressed air streams.

BACKGROUND AND SUMMARY OF THE INVENTION

Compressed air is widely used in industry as an energy source. One problem associated with the use of compressed air is maintaining a relatively clean and dry supply of compressed air. For example, as atmospheric air is introduced into an air compressor, contaminants such as water vapor, dirt, particles, and oils and other lubricants associated with the compressor or the industrial setting can be introduced into the compressor. During compression, the temperature of the air increases, thus increasing the ability of the air to retain moisture. Normally, the compressed air is passed through aftercoolers and moisture separators, yet despite this the air can remain substantially saturated with oil and water and other contaminants. As the air travels through piping during use, the vapor condenses and creates corrosion. This can lead to expensive downtime and equipment failure. Accordingly, there remains a need in the art for improvements in the treatment of compressed air to dry it and otherwise remove contaminants.

The present invention is directed to a separator for removing contaminants from compressed air. In a preferred embodiment, the separator includes an elongate enclosure having an inlet end and an opposite outlet end. The inlet end of the separator is in flow communication with a source of compressed air and the separator defines a first air flow path between the inlet and outlet ends of the separator and a second air flow path between the outlet end of the separator and a wall member positioned adjacent outlet end of the separator for being contacted by air exiting the outlet end of the separator. Air traveling in the first flow path undergoes a volumetric expansion and substantial change of direction as it exits the separator and enters the second air flow path and further undergoes a change of direction as it impacts the wall member.

In another aspect, the invention relates to a air dryer for treating an inlet stream of air to remove water vapor therefrom to provide a dehumidified outlet stream of air. In a preferred embodiment, the dryer includes an air inlet for introducing the inlet steam of air into the dryer and an air outlet for removing the outlet stream from the dryer. A heat exchanger associated with the dryer includes first and second discrete air flow paths. The first air flow path has an inlet end and an opposite outlet end with the inlet end of the first air flow path being in flow communication with the air inlet. The second air flow path includes an inlet end and an opposite outlet end with the outlet end of the second air flow path being in flow communication with the air outlet and an opposite inlet end. An expansion channel is located within the dryer for expanding the flow of air exiting the first flow path. The expansion channel has an inlet end and an outlet end, the inlet end of the expansion channel being in flow communication with the outlet end of the first air flow path of the first heat exchanger. An evaporator is downstream of the expansion channel and includes a third air flow path and a refrigerant flow path. The third air flow path has an inlet end and an opposite outlet end with the inlet end of the third air flow path being in flow communication with the outlet end of the expansion chamber. The refrigerant flow path has an inlet end and an opposite outlet end. A refrigeration system is in flow communication with the refrigerant flow path of the evaporator for circulating refrigerant through the refrigerant flow path of the evaporator. A separator located downstream of the evaporator includes an inlet end and an opposite outlet end. The inlet end of the separator is in flow communication with the outlet end of the third air flow path. The separator defines a fourth air flow path between the inlet and outlet ends of the separator and a fifth air flow path between the outlet end of the separator and a wall member positioned adjacent outlet end of the separator. The wall member is located to be contacted by air exiting the outlet end of the separator. Air traveling in the fourth flow path undergoes a volumetric expansion and substantial change of direction as it exits the separator and enters the fifth air flow path and further undergoes a change of direction as it impacts the wall member. A demister is positioned in flow communication with the fifth air flow path and the inlet end of the second air flow path for receiving air traveling in the fifth air flow path and conducting it to the second air flow path for travel therethrough.

A significant advantage of the invention is that the dryer 10 of the invention remains effective to remove moisture and other contaminants over a wide range of flow rates. For example, the separator functions to remove contaminants by impaction and imparting Brownian Motion to contaminants, thus resulting in their separation from the flow of air. The demister further achieves separation by providing an environment wherein surface tension results in removal of contaminants from the air flow.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
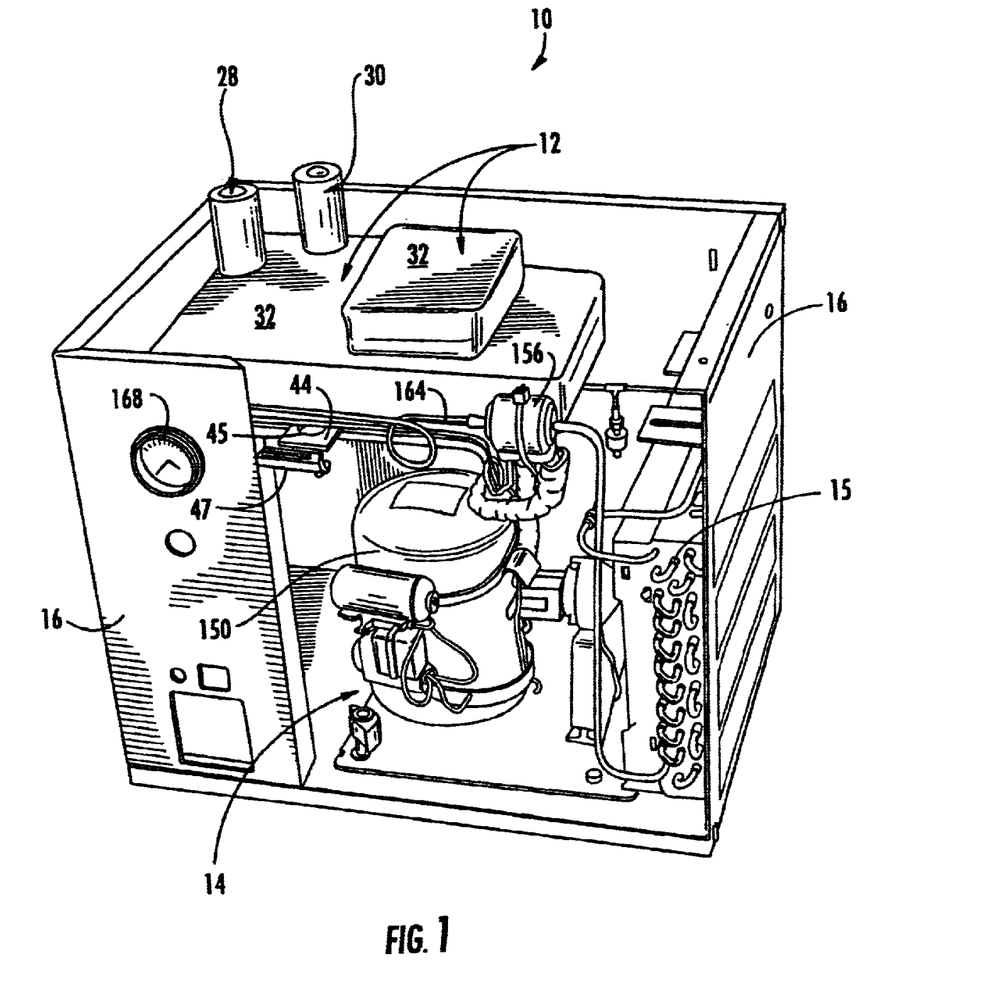
FIG. 1 is a perspective view of an air dryer system in accordance with a preferred embodiment of the invention.
Figure 2:
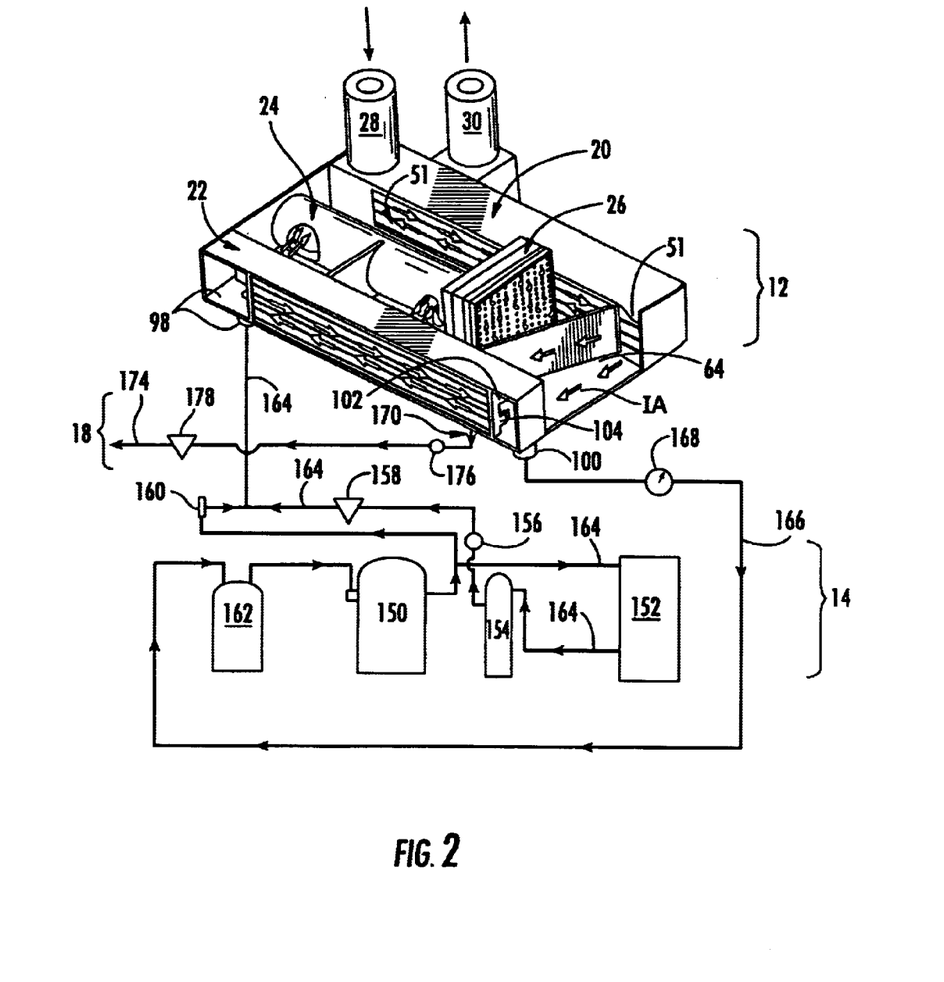
FIG. 2 is a detailed view of the system of FIG. 1.

With initial reference to FIGS. 1 and 2, the invention relates to a dryer 10 having a heat exchange/drying system 12 and a refrigeration system 14 enclosed within a vented housing 16. A drain system 18 collects and removes liquids and any entrained solids from the dryer 10. A preferred construction material for the dryer is aluminum.

A significant advantage of the dryer of the invention as compared to prior art dryers is that it is able to treat variable flows of compressed air. Typical dryers are designed to cool and dehumidify air streams of a predetermined flow rate and become substantially ineffective if the flow rate varies. For example, a conventional system configured for a 100 cfm flow of air typically function effectively as long as the flow rate remains above about 60 cfm. However, in the event the flow rate drops below about 60 cfm, the effectiveness of the dryer separator dramatically decreases. To the contrary, the effectiveness of a dryer 10 of the invention configured to treat a 100 cfm stream is maintained even if the flow rate of the air stream drops significantly below 60 cfm, even to slightly above zero cfm.

With reference to FIGS. 3–12, the heat exchange/drying system 12 includes a precooler/reheater 20, an evaporator 22, a separator 24, and a demister 26. Air to be treated enters the system 12 via an air inlet 28. Treated air exits the system 12 via an air outlet 30. The system 12 as seen in FIG. 1 is preferably covered in an insulative material 32, such as a closed cell elastomeric material. Each of the components of the system 12 is preferably of aluminum construction.

Figure 3:
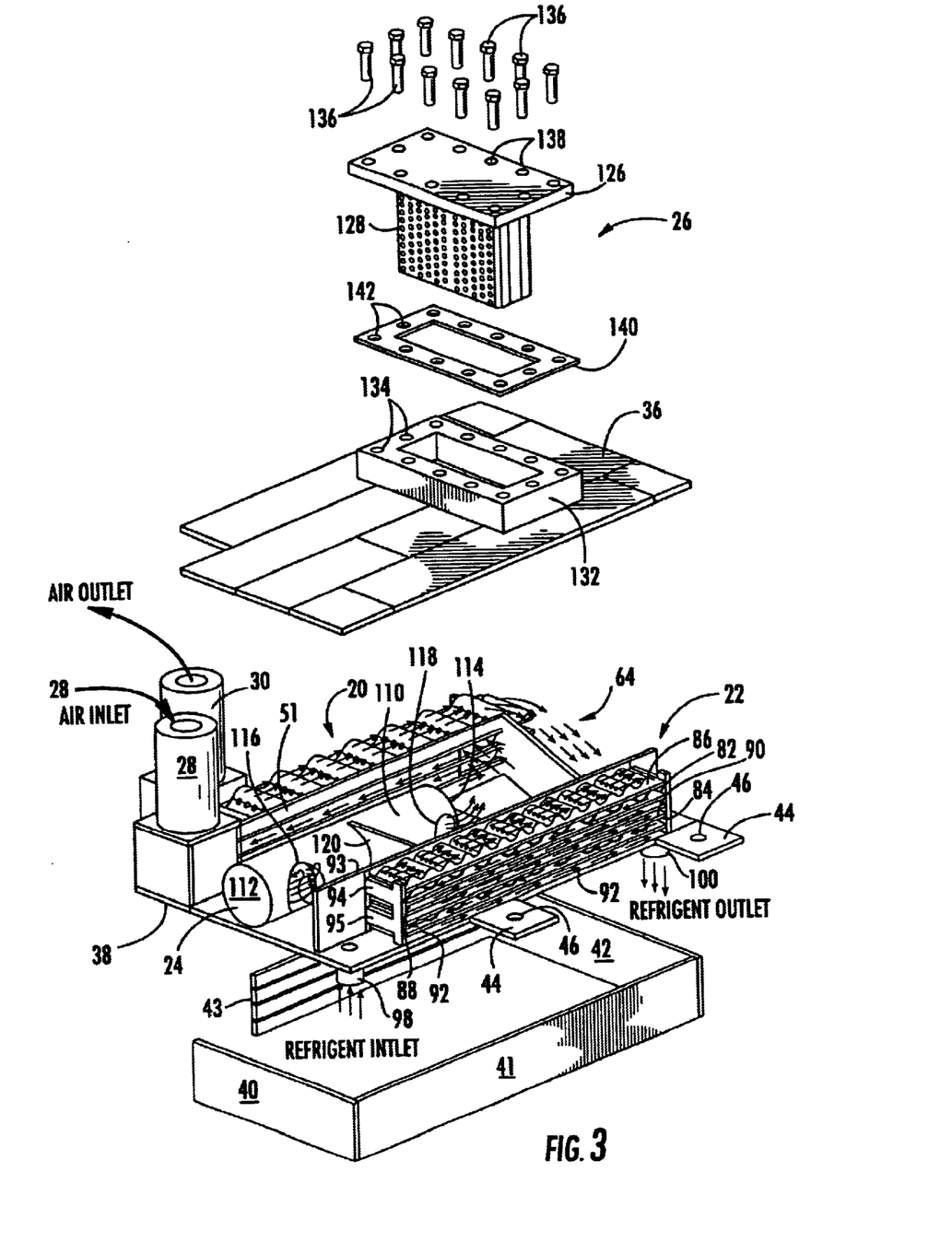
FIG. 3 is an exploded view of a heat exchange/drying system of the dryer of FIG. 1.
Figure 11:
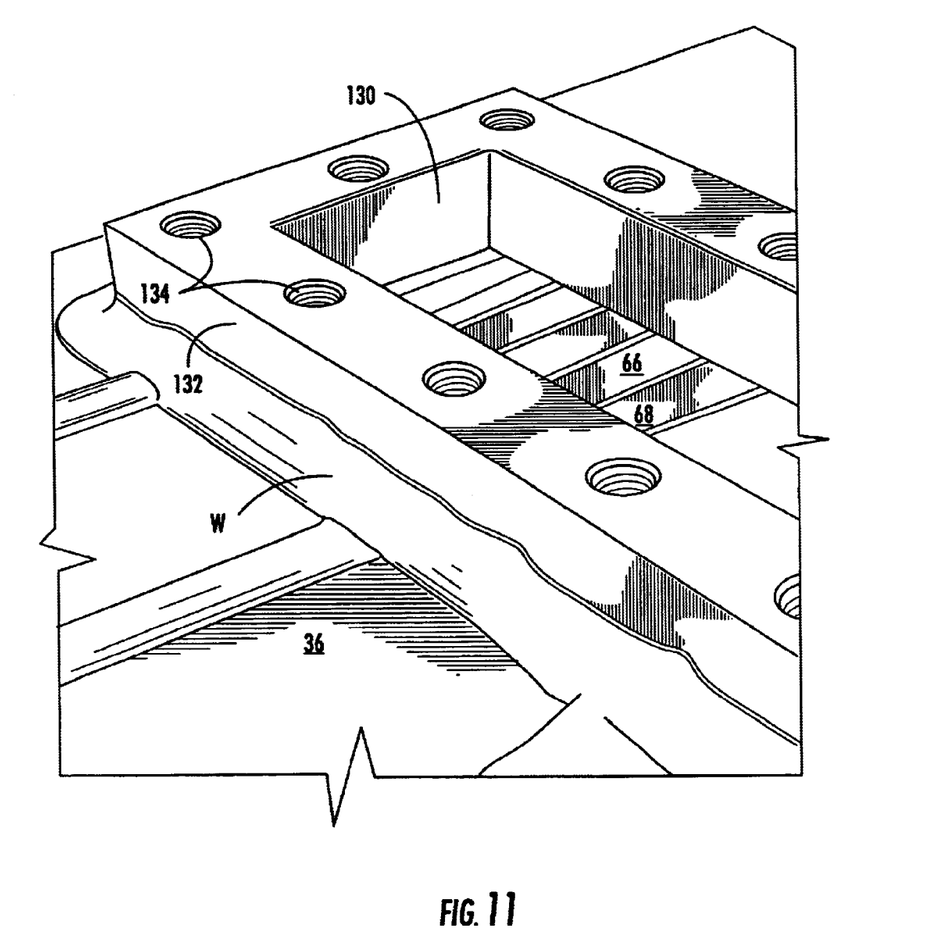
FIG. 11 is a perspective view showing ports for entrance of the outlet air into the precooler/reheater component from the demister.
Figure 12:
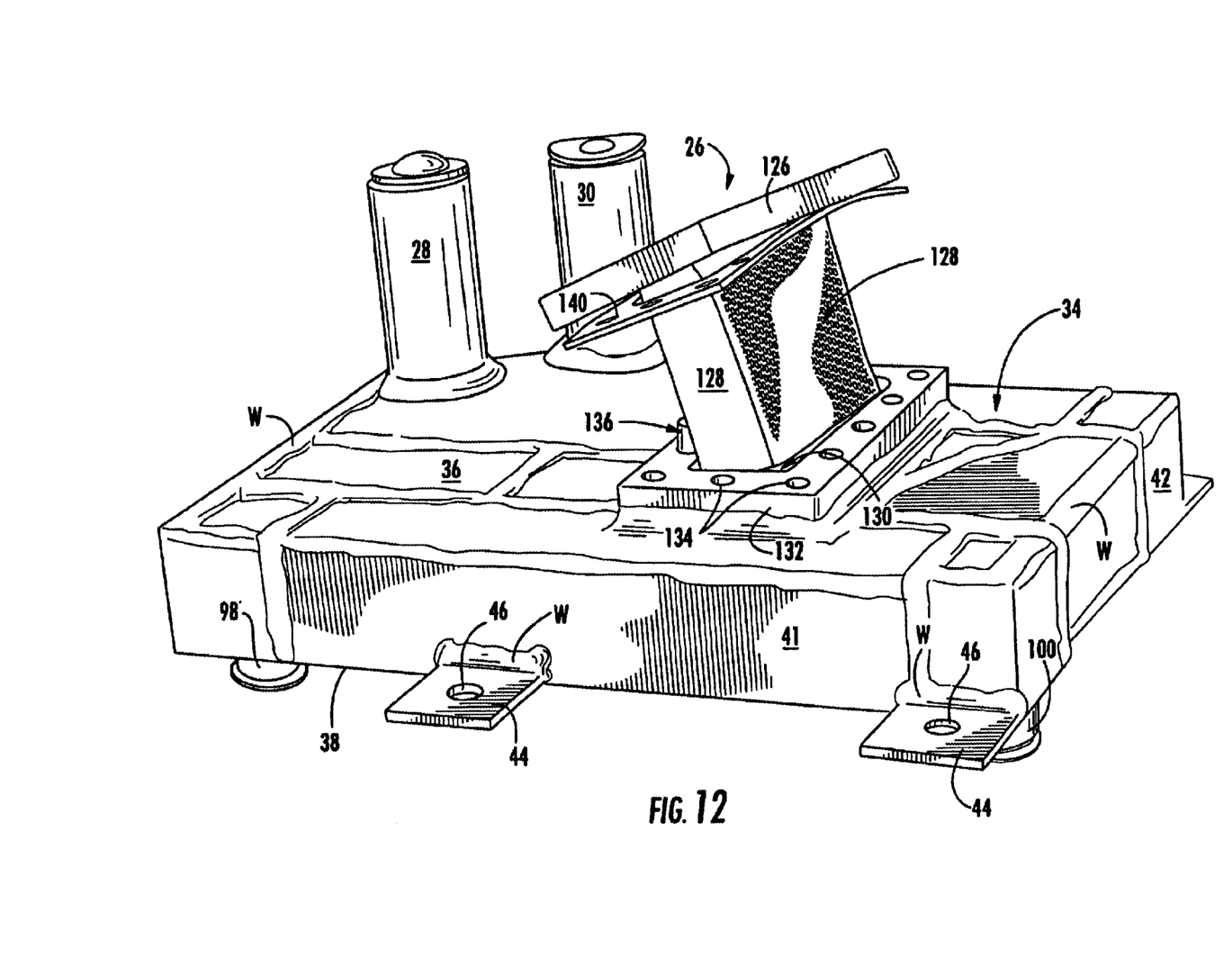
FIG. 12 is a perspective view showing installation of the demister component.

With reference to FIGS. 1 and 3, the system 12 is housed within an enclosure 34 having portions thereof in flow communication with the air inlet 28, the air outlet 30, and refrigerant outlet and outlet ports associated with the refrigeration system 14 (described below). The enclosure 34 includes a top 36, a bottom 38, and sidewalls 40, 41, 42, and 43. The components of the enclosure 34 are preferably secured together as by welds W (FIG. 11). Mounting brackets 44 preferably extend from the bottom 38 for mounting the system 12 to the housing 16, as by the use of bolts 45 or other fasteners passed through apertures 46 of the brackets 44 and corresponding apertures of brackets 47 of the housing 16.

The dryer 10 shown and described herein is configured for treating compressed air streams generally having a flow rate of about 100 cfm at a pressure of about 100 psi. Typically, the temperature of such an air stream as it enters the system 12 is about 100° F., with a relative humidity of about 100 percent. Treatment of such an air stream using the dryer 10 as configured herein generally does not affect the flow rate or the pressure, except for a few psi drop resulting from travel through the dryer, but decreases the temperature of the air so that it is about 80° F. as it exists the dryer 10 and decreases the dew point of the air to from 33° F. to about 39° F. as it exists the dryer. However, it will be understood that the dryer 10 may be sized to treat streams of other flow rate, pressure, humidity, and temperature, or to yield outlet streams having different characteristics.

Figure 4:
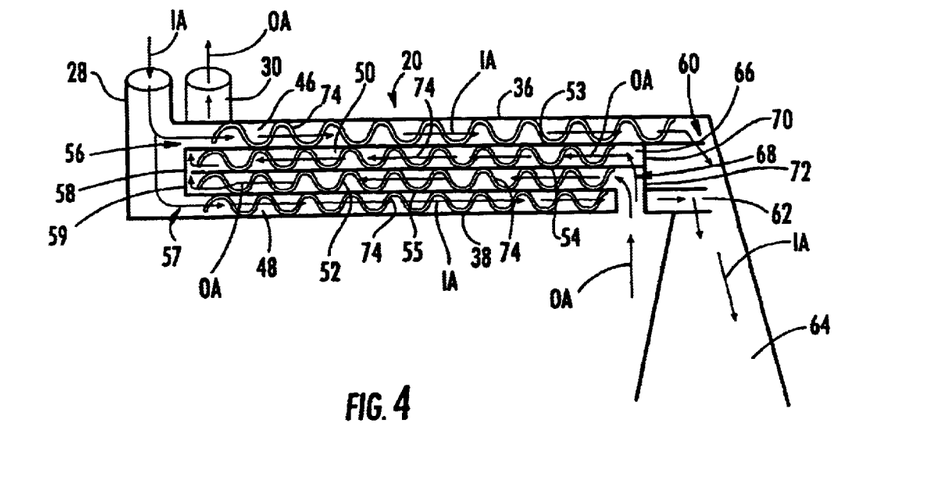
FIG. 4 is a cross-sectional side view of a precooler/reheater component of the heat exchange/dryer system of FIG. 3.

The precooler/reheater 20 functions to perform an initial cooling of the compressed air to be treated and to heat the treated air prior to it exiting the dryer via the outlet 30 for re-use in a compressed air system. Turning to FIGS. 3 and 4, the precooler/reheater 20 includes one or more inlet air flow channels, such as channels 46 and 48 each having an end thereof in flow communication with the air inlet 28, and one or more outlet air or treated air channels, such as channels 50 and 52, each having an end thereof in flow communication with the air outlet 30. Each channel 46, 48, 50, and 52 is preferably substantially rectangular in configuration and substantially uniform in dimension. For a system generally configured for treatment of an air stream having a flow rate of 100 cfm as described above, each channel preferably has a length of about 16 inches, a width of about 9.5 inches, and a height of about 2.5.

The channels 46–52 are enclosed by portions of the enclosure 34, such as the top 36, bottom 38, and the sidewalls 42 and 43, an interior sidewall 51, and plates 53, 54, and 55 located between adjacent ones of the channels and secured as by welding (FIG. 4). Inlet air (the air to be treated) travels in the channels 46 and 48 in the general direction indicated by the arrows IA. The outlet air (the treated air) travels in the channels 50 and 52 in the general direction of the arrows OA, which direction is generally countercurrent to the direction of the inlet air.

The inlet air is introduced into the channels 46 and 48 via inlet ends 56 and 57 of the channels 46 and 48 which are open and in flow communication with the air inlet 28. End walls 58 and 59 located at the terminal ends of the channels 50 and 52, respectively, prevent the inlet air from entering the channels 50 and 52. Sides of the channels 50 and 52 adjacent the air outlet 30 are removed to place the terminal ends of the channels 50 and 52 in flow communication with the air outlet 30.

The inlet air exits the channels 46 and 48 via open sides 60 and 62 thereof located at the terminal ends of the channels 46 and 48, respectively. The sides 60 and 62 are in flow communication with an expansion channel 64 by which the air exists the channels 46 and 48 for further travel through the system 12. The expansion channel 64 is mounted substantially normal to the channels 46 and 48 so that it thus causes the direction of the flow of the inlet air to change abruptly. The channel 64 also merges the air flows of the channels 46 and 48 and increases in dimension along its length so that the flow path of the inlet air is significantly expanded. The abrupt change in direction and expansion of the flow of the inlet air advantageously results in a decrease in moisture of the air stream as well as a loss of other entrained matter.

The outlet air enters the channels 50 and 52 via open sides 66 and 68 of the channels located adjacent the inlet ends of the channels 50 and 52. End walls 70 and 72 seal the ends of the channels 50 and 52 adjacent their inlet ends to isolate the air flows of the incoming outlet air from the exiting inlet air.

As noted above, the precooler/reheater 20 performs an initial cooling of the air to be treated and heats the treated air prior to it exiting the dryer 10. In this regard, for the described precooler/reheater and 100 cfm inlet stream having a temperature of about 100° F., the temperature of the inlet air is dropped to about 75° F. as it exits the channels 46 and 48 and enters the channel 64. During travel through the channel 64, the temperature of the air generally decreases by a few degrees, to about 72° F. The outlet air introduced into the channels 50 and 52 via the demister 26 generally has an initial temperature of about 35° F. and a temperature of about 80° F. as it exits via the outlet 30.

Figure 6:
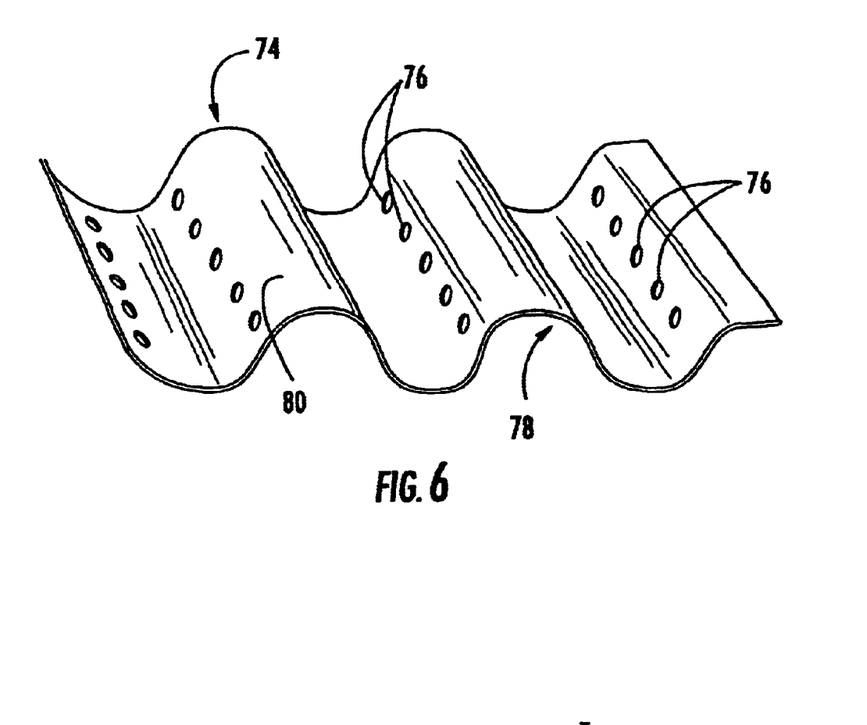
FIG. 6 is a perspective view of a corrugated member used in precooler/reheater component of FIG. 4 and in the evaporator component of FIG. 5.
Figure 7:
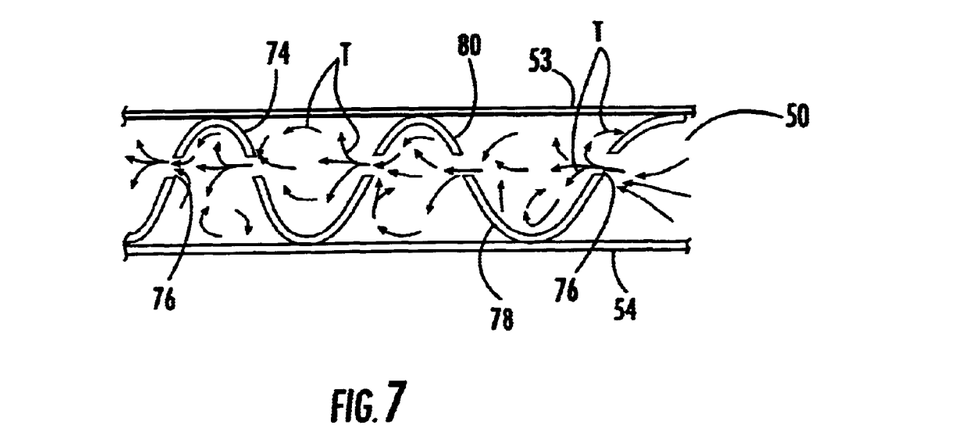
FIG. 7 is a cross-sectional side view of the corrugated member of FIG. 6.

In order to achieve the above thermal results and maintain a relatively compact configuration of the dryer 10, each of the channels 46, 48, 50 and 52 preferably includes one or more deflection members to increase the surface area against which the air contacts as it travels through the channel, impart turbulence to the air flow, and increase the residence or contact time of the air within the channels. With reference to FIGS. 6 and 7, there is shown a preferred deflection member as provided by an elongate corrugated member 74 having a plurality of apertures 76 formed through opposite surfaces 78 and 80 of the member 74. The apertures 76 may be uniformly spaced or non-uniformly spaced. The apertures 76 may be of uniform diameter and/or configuration, i.e., circular, or they may be of non-uniform diameter and/or configuration, i.e., some oval, circular, or other shape.

The corrugated member 74 preferably has a width corresponding substantially to the width of the channels 46–52 and a height substantially corresponding thereto. In FIG. 7, one of the corrugated members 74 is shown installed in the channel 50, intermediate the plates 53 and 54. As will be noted, the air is constrained to travel through the apertures 76 to advance along the length of the channel. This results in a relatively turbulent flow of air, as the air expands as it exits each aperture and must thereafter constrict to enter the next aperture 76. Thus, the corrugated member 74 serves to impart turbulence to the air flow, as represented by the arrows T, to increase the surface area available for contacting the air, and to increase the contact time. Each of these factors aids in improving thermal transfer between the channels and their adjacent surfaces to promote heat transfer for cooling the inlet air and heating the outlet air.

Figure 5:
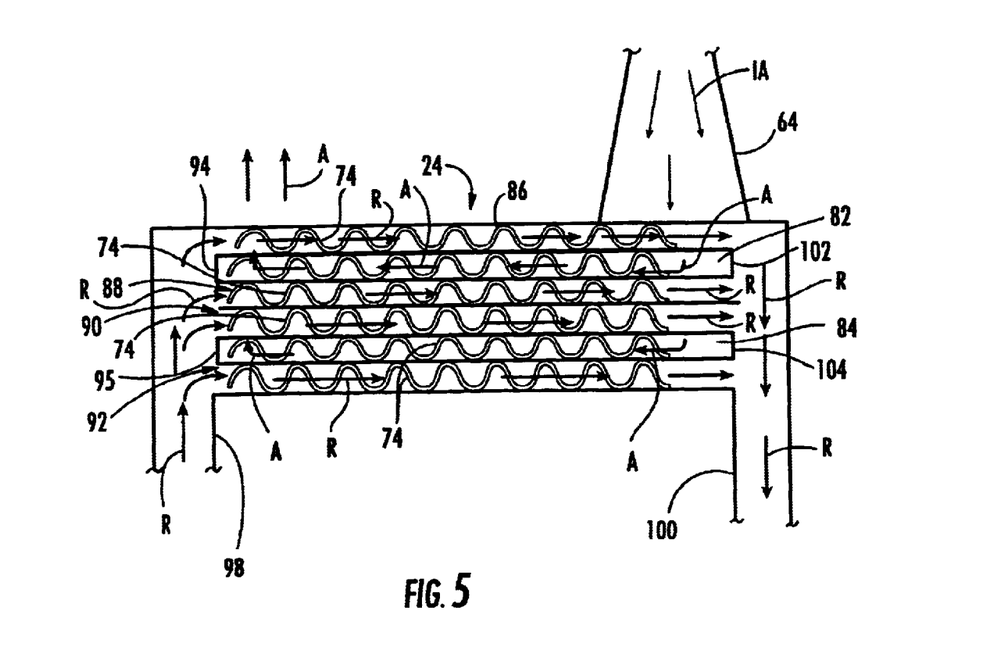
FIG. 5 is a cross-sectional side view of an evaporator component of the heat exchange/dryer system of FIG. 3.

The evaporator 22 further cools the air to be treated. Continuing with the example herein, the evaporator generally cools the air from its entrance temperature of about 72° F. to an exit temperature of about 35° F. Turning to FIG. 5, the evaporator 22 includes one or more air channels, such as air channels 82 and 84, and one or more refrigerant channels, such as channels 86, 88, 90, and 92. The construction of each of the channels 82–92 is substantially similar to that previously described in connection with the channels 46–52, with each channel being substantially enclosed (except as to provide the desired ingress and egress of fluid such as air or refrigerant) and including a corrugated member 74. In this regard, an interior sidewall 93 is provided (similar to sidewall 51).

As will be noticed, however, each air channel 82 and 84 is sandwiched between at least two of the refrigerant channels 96–92. Thus, each layer of air is in contact from top to bottom with two layers of refrigerant. In addition, the flow of refrigerant is counter-current to the flow of air. This is advantageous to enhance the heat transfer between the air and the refrigerant to rapidly decrease the air temperature over a relatively short distance. This is advantageous to reduce the size of the system. The sandwiched construction of the air channels relative to the refrigeration channels is also advantageous to protect the refrigeration compressor from liquid back flush. For example, the two layers of refrigerant promote evaporation of the refrigerant due to its contact with the higher temperature air stream on both sides.

Air to be treated (the inlet air from the channels 46 and 48 of the precooler/reheater 20) is introduced from the expansion channel 64 into the channels 82 and 84 via openings in the sides of the channels 82 and 84 and flows as indicated by the arrows A. The terminal ends of the channels 82 and 84 are closed as by walls 94 and 95, and the air exists the channels 82 and 84 via openings in the sides of the channels for travel to an air outlet 96 by which it is introduced into the separator 24.

Refrigerant, such as R134A, R404, R407C or the like is introduced from the refrigeration system 14 via refrigerant inlet 98 in flow communication with the ends of the channels 86–92 for travel in the direction indicated generally by the arrows R. The flow of the air and the flow of the refrigerant is preferably counter-current. The refrigeration exits the channels 86–92 via their terminal ends, which are in flow communication with refrigerant outlet 100 for travel back to the refrigeration system 14. The ends of the channels 82 and 84 are closed as by walls 102 and 104.

Figure 8:
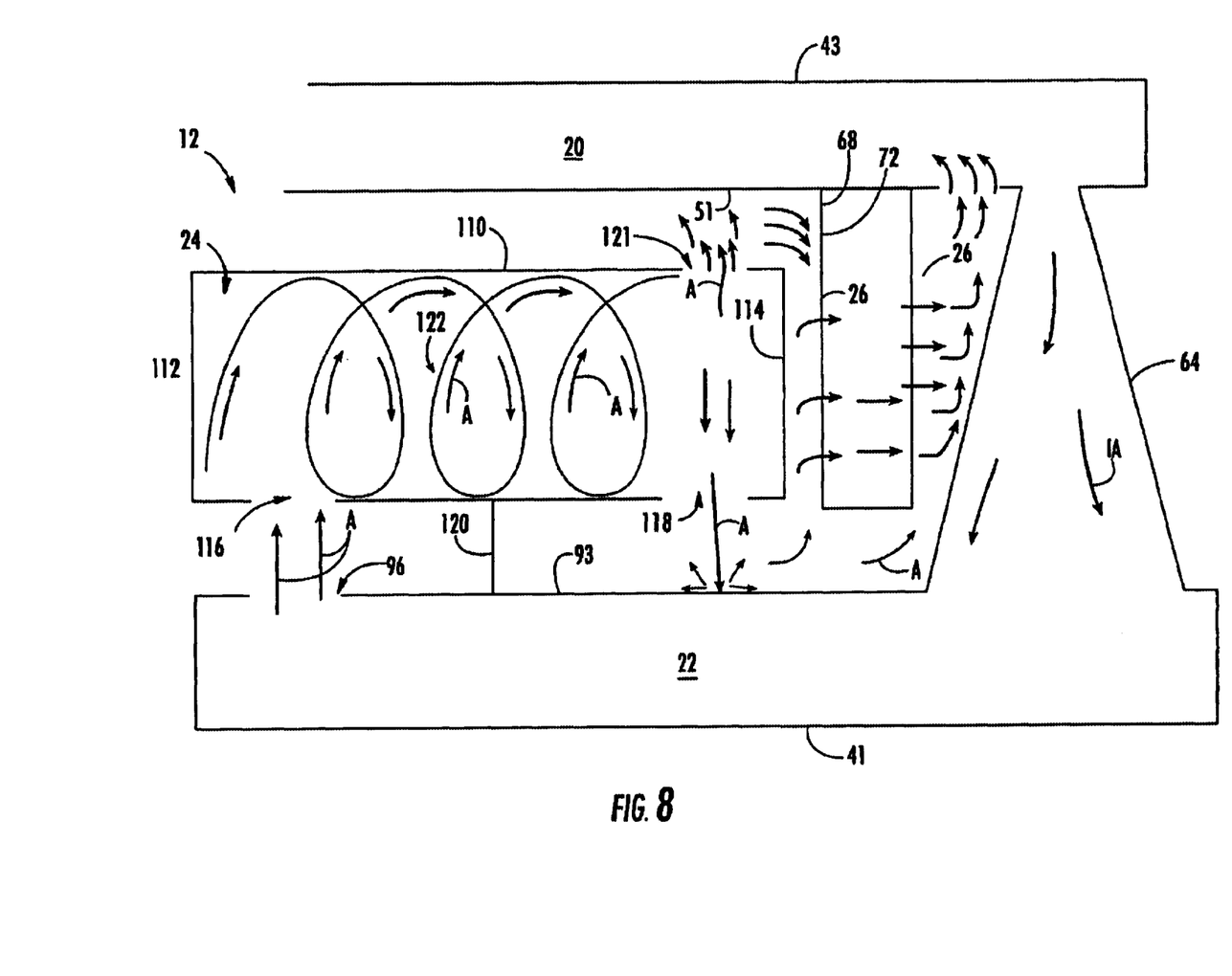
FIG. 8 is a top representational view showing separator and demister components of the heat exchange/dryer system of FIG. 3.

The separator 24 removes liquids and contaminants from the air stream transferred thereto from the evaporator 22 via the outlet 96. Turning to FIG. 8, the separator 24 includes an elongate cylinder 110 having opposite closed ends 112 and 114. An entrance for the travel of air into the cylinder 110 is provided as by an aperture 116 extending through the sidewall and an exit is provided as by an aperture 118 through the sidewall adjacent the opposite closed end 114. A brace 120 preferably extends between the cylinder 110 and the sidewall 93 for strength and to restrict the travel of air toward the end 112 after it exits the cylinder 110 via the aperture 118. In a preferred embodiment and for the configuration described herein, the aperture 118 is preferably spaced from about 1.25 inches to about 1.5 inches from the sidewall 93. An additional aperture 121 is preferably provided opposite the aperture 118 so as to flow air toward the sidewall 51. The sizing o the aperture 121 and spacing relative to the sidewall 51 preferably substantially corresponds to that described fo the aperture 118.

The cylinder 110 preferably has a length of about 6 inches and a diameter of about 2 inches. The apertures 116, 118, and 121 each preferably have a diameter of about 1.5 inches. The cylinder 110 preferably includes one or more internal impact members as structure against which the air impacts as it travels through the cylinder and which promotes a centrifugal orientation to the flow. A preferred impact member is a spiral or auger-like member 122 located within and substantially filling the cylinder 110 (FIG. 9) having a plurality of flights 124 along its length. Impaction of the air as by use of an impaction member such as the spiral member 122 is advantageous to cause the flow to change direction repeatedly (while still retaining a general direction of travel along the length of the cylinder) to cause contaminants to separate from the air flow.

Figure 9:
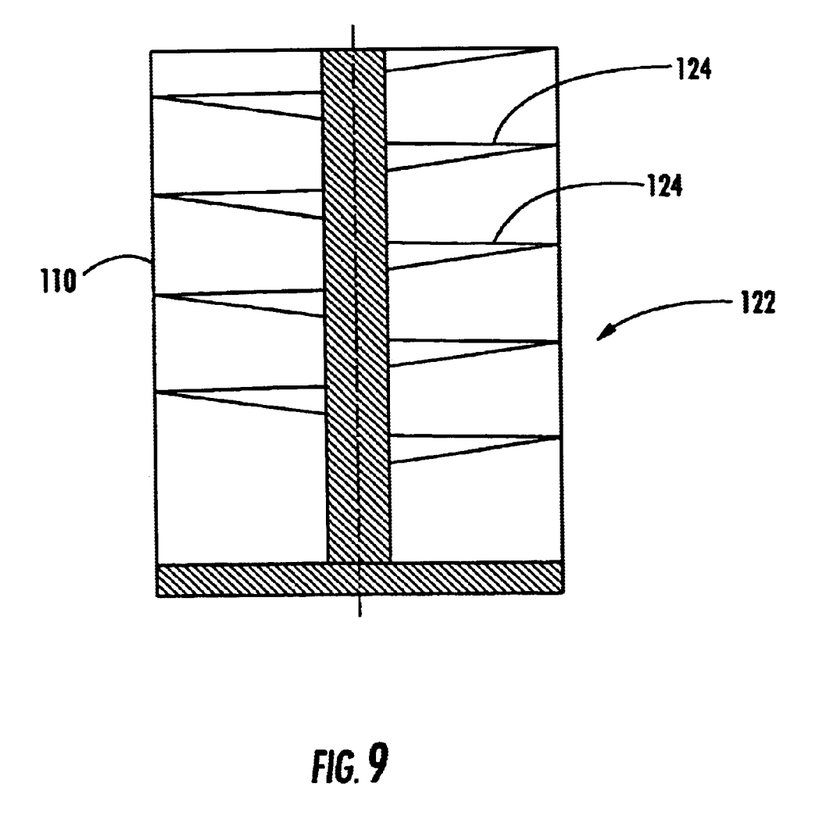
FIG. 9 shows a preferred centrifugal component of the separator.
Figure 10:
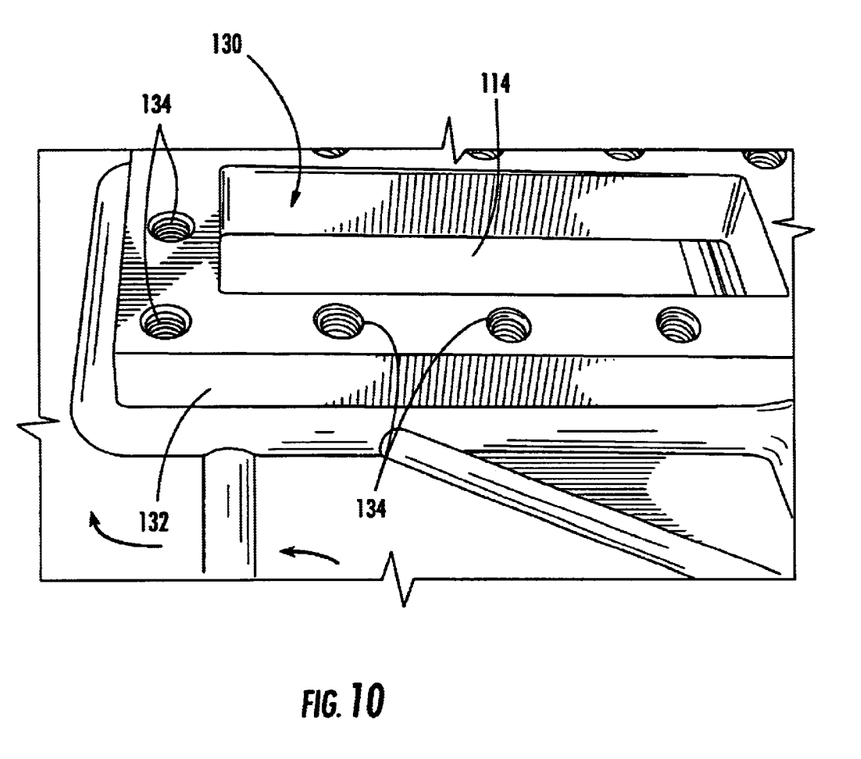
FIG. 10 is a perspective view showing the position of the separator.

For example, as the air enters the separator housing it is forced in a circular motion around the inner wall. By incorporating a spiral or auger structure inside the separator, a centrifugal separation occurs, dependent in part upon the entering velocity of the air. The air then moves toward the outlets provided by the apertures 118 and 121 and undergoes abrupt changes of direction as it exists the separator, which further enhances separation. The construction of the separator incorporating structure for changing flow direction thus also yields separation characteristics that are not directly dependent upon the air velocity.

With additional reference to FIG. 8, it will be seen that as the air exits the cylinder 110 via the aperture 118, the flow of air expands (thereby slowing) and undergoes a sudden and substantial change of direction as compared to its direction of travel within the cylinder. For example, it will be appreciated that the travel of the air within the cylinder generally has a direction of travel corresponding to the length axis of the cylinder, as well as directional components imparted by the impact member. However, to exit the cylinder, the flow of air must make a sudden and substantial change of direction, toward a direction that is substantially normal to the length axis of the cylinder. It will be appreciated that greater or lesser changes of direction will suffice, so long as the desired dewatering affect is achieved. This sudden change of direction, coupled with a loss of velocity from the enlargement of the flow area exterior to the cylinder generally results in a loss of liquids and solids from the air stream. In addition, the flow thereafter impacts the sidewall 93 resulting in another sudden change of direction of the flow. In combination, the slowing of the air flow and the sudden changes of direction results in significant dewatering and removal of contaminants. Under such circumstances, moisture and other contaminants generally cannot remain with the air flow and fall out or cling to the sidewall.

For example, it has been observed that water vapor and other contaminants entrained in the air will tend to drop out of the flow as the flow slows. Next, the impact of the flow against the sidewall and the associated change in direction causes solids to drop out and for liquids to cling to the sidewall and run down the sidewall to the bottom 38. Without being bound by theory, it is believed that the flow imparted to the air flow by the structure also results in so-called "Brownian Motion" of the entrained particles, resulting in their separation from the air. In this regard, the term "Brownian Motion" will be understood to refer generally to a random movement of microscopic particles suspended in liquids or gases resulting from the impact of the molecules of the fluid surrounding the particles.

Figure 13:
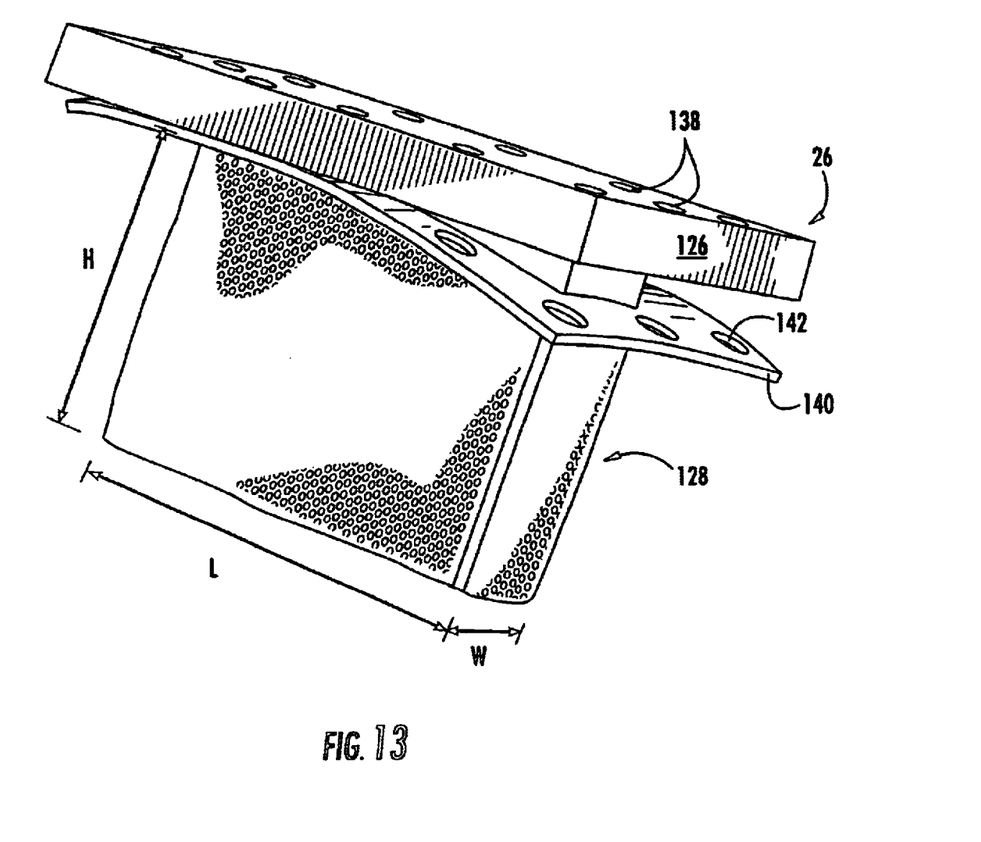
FIG. 13 is a detailed view of the demister component.

Next, the air flow A travels through the demister 26 and into the channels 50 and 52 of the precooler/reheater 20, from which it is expelled from the dryer 10 via the outlet 30. The demister is preferably a mesh material that divides the flow of air into a plurality of flow paths as it travels through the mesh. Turning to FIGS. 10–13, the demister 26 includes a top 126 and a body portion 128 extending substantially perpendicular away from a lower surface of the top 126. The body portion 128 is preferably provided as by a stainless steel mesh material having a mesh size of about 40 microns, with the body portion having a width W of about 1.25 inches, a length L of about 5 inches, and a height H of about 3.5 inches (FIG. 13). The body portion 128 is removably positionable within the enclosure 34 so that air must travel through the demister to reach the channels 50 and 52. In a preferred embodiment, one length surface of the body portion 128 is adjacent the end 114 of the cylinder 110 and the other length surface of the body portion is adjacent the open sides 66 and 68 of the channels 50 and 52. However, it will be understood that other positioning of the demister may be utilized to cause the air to travel through the demister before reaching the channels 50 and 52.

The body portion of the demister 26 may be installed as by inserting it through a slot 130 extending through the top 36. The slot 130 is surrounded by a raised rib 132 having a plurality of threaded openings 134 for receiving bolts 136. The bolts 136 pass through corresponding openings 138 of the top 126. A gasket 140 is preferably located to seal between the top of the rib 132 and the lower surface of the top 126. Openings 142 of the gasket 140 correspond to the openings 134 and 138. As will be appreciated, the demister 26 may be readily removed, such as for cleaning or replacement.

As air travels through the separator, changing direction, a majority of the water will be dropped, leaving primarily a fine mist in the form of a fog or vapor. As this mist passes through the demister, the mist tends to cling to the mesh and develop droplets that increase in size over time. When a droplet is sufficiently large, it tends to drop from the mesh and is collected in the drain system 18. This action is believed to be relatively independent of the air velocity, so that the demister is effective to remove water for virtually any experienced flow rate. In addition, it has been observed that oil and other contaminants also tend to release from the air flow and cling to the mesh and thus separate from the air flow.

Returning to FIG. 2, the refrigeration system 14 preferably includes a compressor 150, a condenser 152, a receiver 154, a filter/dryer 156, a thermostatic expansion valve 158, a hot gas by-pass valve 160, and a suction accumulator 162. Refrigerant is fed from the refrigeration system 14 to the evaporator 22 via conduit 164 in flow communication with the refrigeration inlet 98. Refrigerant is returned from the evaporator 22 to the refrigeration system 14 via conduit 166 in flow communication with the refrigerant outlet 100. A temperature gauge 168 is preferably located in-line on the conduit 164 and/or 166 for monitoring of the refrigerant temperature.

The compressor 150 pumps hot, high pressure gaseous refrigerant to the condenser 152. The condenser 152 cools and liquifies the refrigerant. From the condenser the refrigerant flows through the receiver 154, then the filter/dryer 156, and through the expansion valve 158 where pressure and temperature are reduced. This reduction in pressure causes the liquid refrigerant to boil until it reaches the saturation temperature which corresponds to its pressure. As the low pressure refrigerant passes through the evaporator 22, the refrigerant continues to boil until all refrigerant is vaporized. Refrigerant gas is returned to the compressor and the cycle is repeated. The by pass valve 160 may be used to control temperature in the evaporator 22.

Figure 14:
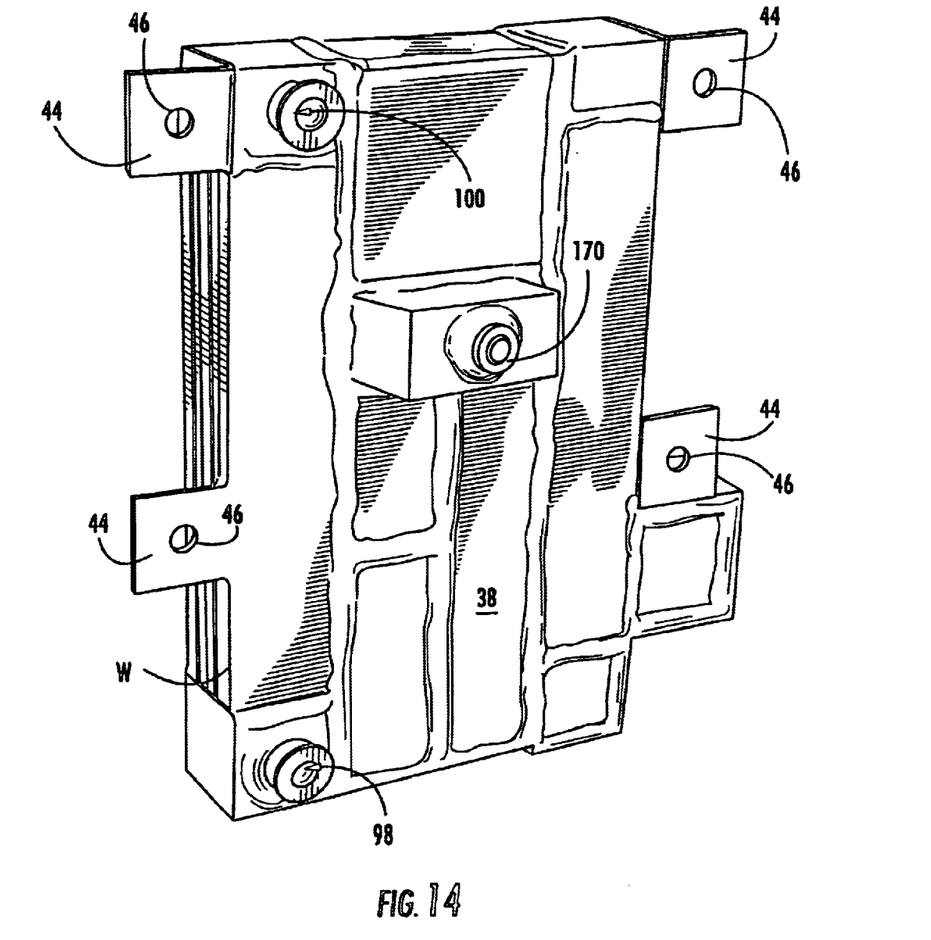
FIG. 14 is a bottom perspective view of the heat exchange/drying system of FIG. 3.

With reference to FIGS. 2 and 14, the drain system 18 includes a sump 170 having a drain opening 172. The sump 170 is preferably formed as part of the bottom 38 at a location directly beneath the slot 132 so that the bottom of the demister 26 sits over the sump 170. A conduit 174 is in flow communication with the sump 170 via the opening 172 for draining fluids and solids from the sump 170. The drain system 18 also preferably includes a check valve 176 and a solenoid valve 178. The check valve 176 inhibits back-flow and the valve 178 is preferably operated via a timer to periodically enable emptying of the sump. If desired, a suction may be applied to the conduit 174 to facilitate drainage.

Figure 15:
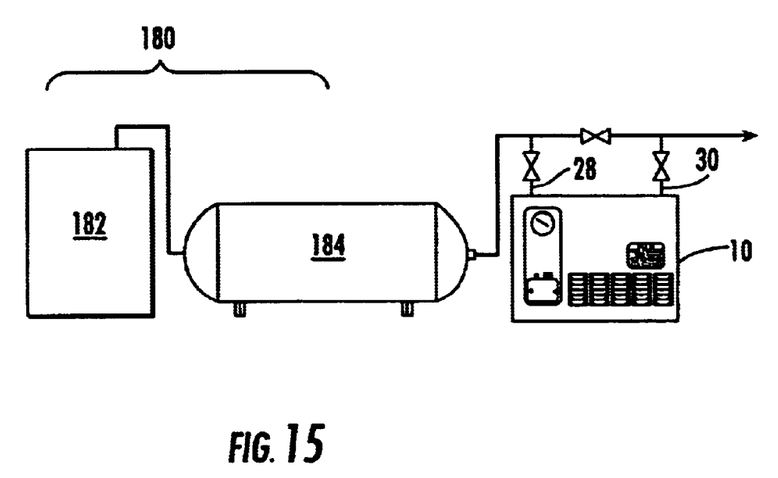
FIG. 15 is a schematic of a compressed air system incorporating the dryer of FIG. 1.

Turning now to FIG. 15, the dryer 10 is shown connected to a compressed air system 180 having a source of compressed air, such as a compressor 182 feeding an air receiver tank 184. As will be appreciated, use of the dryer 10 advantageously enables treatment of a stream of compressed air to remove moisture and other contaminants. A significant advantage of the invention is that the dryer 10 of the invention remains effective to remove moisture and other contaminants over a wide range of flow rates. To the contrary, conventional dryers typically are only effective when the flow rate remains within a relatively close range of the flow rate with which the dryer was designed to operate. For example, in the case of a dryer of the invention designed to handle a flow rate of air of about 100 cfm, it has been observed that the dryer effectively removes water and other contaminants even in the event the flow rate drops to very small flow rates of 5 cfm or less, as well as higher flow rates of up to about 115 cfm.

Without being bound by theory, it is believed that the ability of the dryer to remain effective even for low flow rates is due, at least in part, to the ability of the separator 24 to provide a plurality of dewatering environments. For example, as noted earlier, the separator functions to remove contaminants by providing structure which achieves removal of contamination by impaction, Brownian Motion, and by surface tension.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. An air dryer for treating an inlet stream of air to remove water vapor therefrom to provide a dehumidified outlet stream of air, the dryer comprising:

an air inlet for introducing the inlet stream of air into the dryer and an air outlet for removing the outlet stream from the dryer;

a heat exchanger including first and second discrete air flow paths, the first air flow path having an inlet end and an opposite outlet end with the inlet end of the first air flow path being in flow communication with the air inlet, and the second air flow path including an inlet end and an opposite outlet end with the outlet end of the second air flow path being in flow communication with the air outlet and an opposite inlet end, an expansion channel for expanding the flow of air exiting the first flow path, the expansion channel having an inlet end and an outlet end, the inlet end of the expansion channel being in flow communication with the outlet end of the first air flow path of the first heat exchanger;

an evaporator including a third air flow path and a refrigerant flow path, the third air flow path having an inlet end and an opposite outlet end with the inlet end of the third air flow path being in flow communication with the outlet end of the expansion chamber, and the refrigerant flow path having an inlet end and an opposite outlet end;

a refrigeration system in flow communication with the refrigerant flow path of the evaporator for circulating refrigerant through the refrigerant flow path of the evaporator;

a separator including an inlet end and an opposite outlet end, the inlet end of the separator being in flow communication with the outlet end of the third air flow path, the separator defining a fourth air flow path between the inlet and outlet ends of the separator and a fifth air flow path between the outlet end of the separator and a wall member positioned adjacent outlet end of the separator for being contacted by air exiting the outlet end of the separator, wherein air traveling in the fourth flow path undergoes a volumetric expansion and substantial change of direction as it exits the separator and enters the fifth air flow path and further undergoes a change of direction as it impacts the wall member; and a demister positioned in flow communication with the fifth air flow path and the inlet end of the second air flow path for receiving air traveling in the fifth air flow path and conducting it to the second air flow path for travel therethrough.

2. The dryer of claim 1, wherein the first air flow path comprises an enclosed channel having one or more deflection members located therein for increasing the surface area against which the air contacts as it travels through the channel and imparting turbulence to the air flow.

3. The dryer of claim 1, wherein the deflection member comprises an elongate corrugated member having a plurality of apertures formed through opposite surfaces thereof for permitting passage of air.

4. The dryer of claim 1, wherein the second air flow path comprises an enclosed channel having one or more deflection members located therein for increasing the surface area against which the air contacts as it travels through the channel and imparting turbulence to the air flow.

5. The dryer of claim 1, wherein the first and second air flow paths are configured for flowing air in directions countercurrent to one another.

6. The dryer of claim 1, wherein the third air flow path comprises an enclosed channel having one or more deflection members located therein for increasing the surface area against which the air contacts as it travels through the channel and imparting turbulence to the air flow.

7. The dryer of claim 1, wherein the refrigerant path comprises an enclosed channel having one or more deflection members located therein for increasing the surface area against which the refrigerant contacts as it travels through the channel and imparting turbulence to the refrigerant flow.

8. The dryer of claim 1, wherein the third air flow path and the refrigerant flow path are configured for flow in directions countercurrent to one another.

9. The dryer of claim 1, wherein the separator comprises an elongate enclosure having an entrance opening adjacent one end and at least one exit opening adjacent the opposite end, with one or more internal impact members located therein for being impacted by air as it travels therethrough.

10. The dryer of claim 9, wherein the enclosure of the separator is a cylinder and the impact member comprises a spiral member located within the cylinder.

11. The dryer of claim 1, wherein the fourth air flow path has a flow direction generally aligned with a length axis of the separator and the fifth air flow path has a direction as it exits the separator that is substantially perpendicular to the length axis of the separator.

12. The dryer of claim 1, wherein the demister comprises a mesh material defining a plurality of air flow paths.

13. The dryer of claim 1, wherein the demister is removable from the dryer for cleaning purposes.

14. The dryer of claim 1, further comprising a drain located adjacent a lower portion of the dryer for removing contaminants from the dryer.

15. A separator for removing contaminants from air, the separator comprising an elongate enclosure having an inlet end and an opposite outlet end, the inlet end of the separator being in flow communication with a source of air, the separator defining a first air flow path between the inlet and outlet ends of the separator and a second air flow path between the outlet end of the separator and a wall member positioned adjacent outlet end of the separator for being contacted by air exiting the outlet end of the separator, wherein air traveling in the first flow path undergoes a volumetric expansion and substantial change of direction as it exits the separator and enters the second air flow path and further undergoes a change of direction as it impacts the wall member.

16. The separator of claim 15, further comprising one or more internal impact members located therein for being impacted by air as it travels therethrough.

17. The separator of claim 15, wherein the enclosure of the separator is a cylinder and the impact member comprises a spiral member located within the cylinder.

18. The separator of claim 15, wherein the first air flow path has a flow direction generally aligned with a length axis of the separator and the second air flow path has a direction as it exits the separator that is substantially perpendicular to the length axis of the separator.

19. The dryer of claim 1, wherein the inlet stream of air comprises compressed air.

20. The separator of claim 15, wherein the source of air comprises a source of compressed air.

* * * * *